May 19, 1931.  C. R. BENZEL  1,805,864
HAND MOWER
Filed Dec. 12, 1929  2 Sheets-Sheet 2
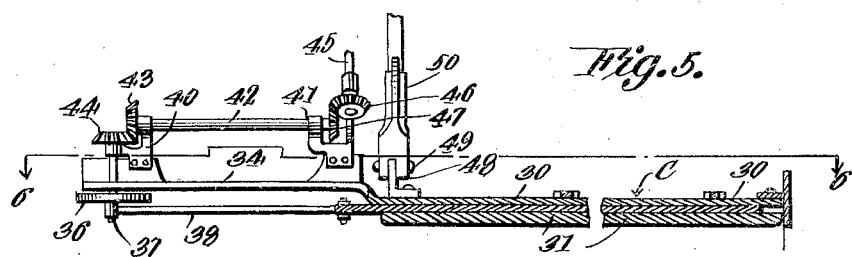
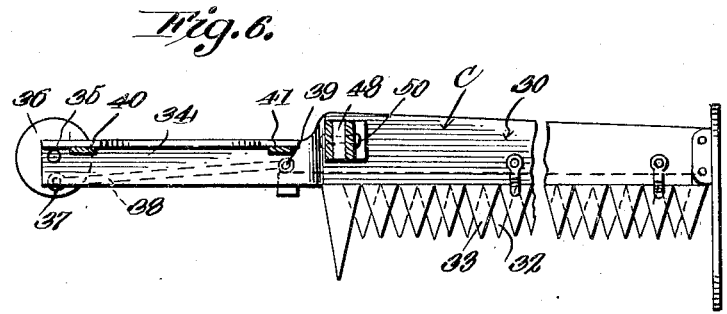
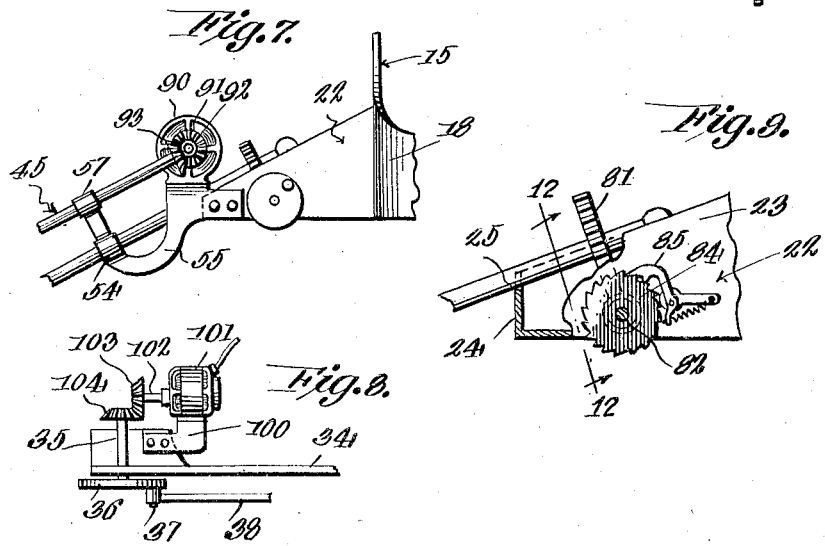
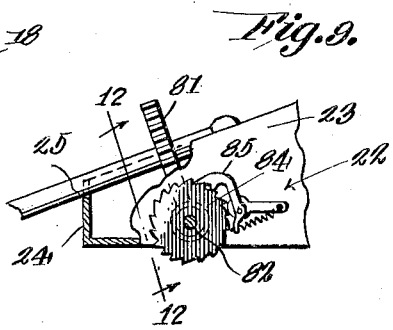
Inventor
CARL R. BENZEL
By Irving L. McCathran
Attorney Patented May 19, 1931

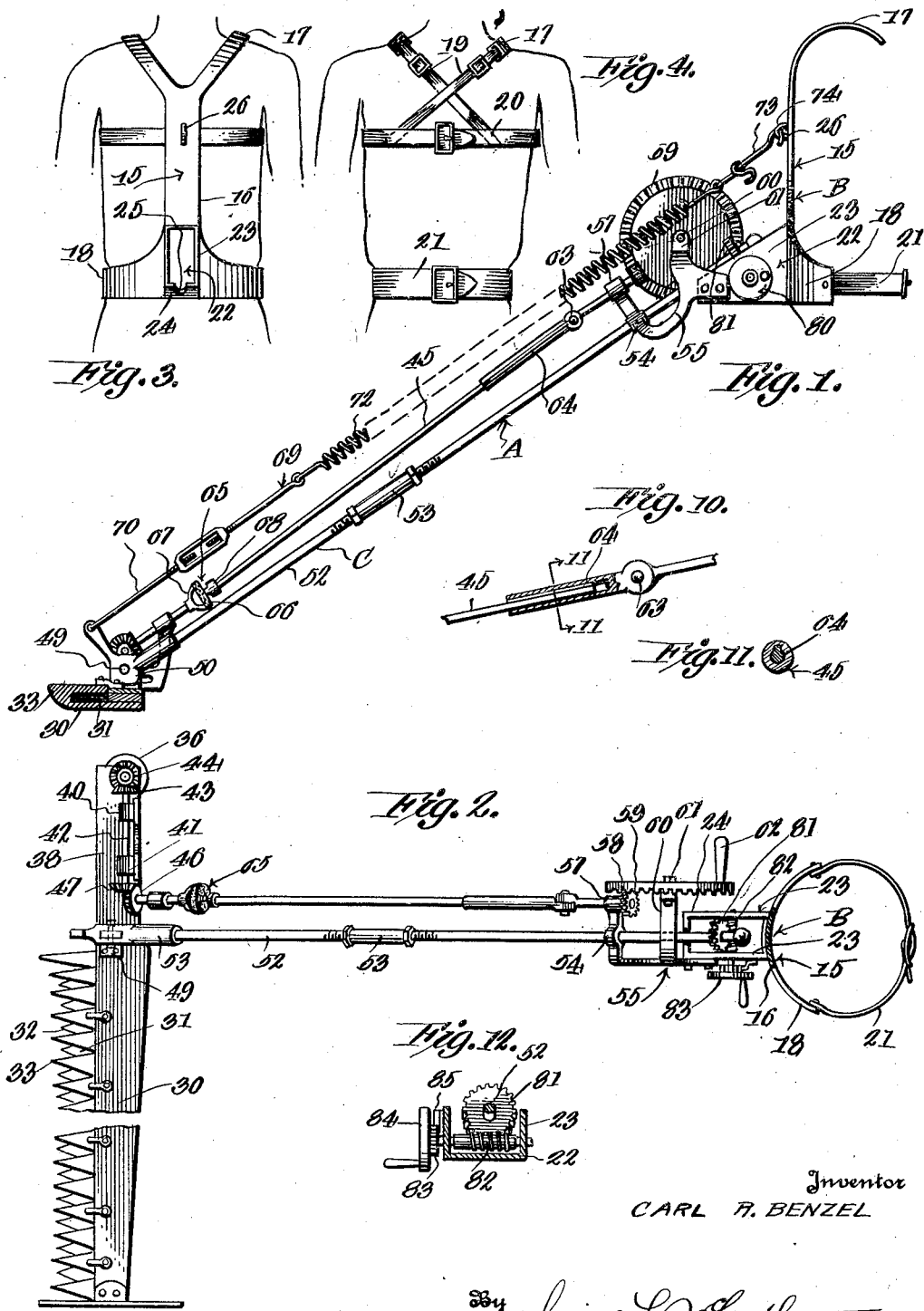

1,805,864

UNITED STATES PATENT OFFICE

CARL R. BENZEL, OF GREELEY, COLORADO

HAND MOWER

Application filed December 12, 1929. Serial No. 413,651.

This invention appertains to a novel device for cutting grass, weeds, and the like, along ditch banks, fences and in such places where the ordinary horse or power operated mower can not be used and where hand devices, such as sickles and scythes must be employed.

One of the primary objects of my invention is to provide a novel hand mower embodying a reciprocatory sickle bar with novel means for operating the bar either by the hand of the operator or a small electrically operated motor.

Another important object of my invention is the provision of novel means for supporting the hand mower from the body of the operator whereby the operator will be relieved from undue strain and whereby the mower bar can be conveniently operated for cutting the grass or weeds.

A further object of my invention is the provision of a novel breast plate connected with the body of the wearer and novel means for connecting the mower with the breast plate with means under control of the operator for adjusting the angle of the mower bar so as to facilitate the cutting of the grass and weeds on slopes and the like.

A further object of my invention is the provision of novel means for operating the reciprocatory sickle or knife blade bar, said means embodying a longitudinally extending drive shaft operated either by the hand of the operator or by a suitable electrically driven motor, the shaft having a telescoping joint and a universal joint to permit the successful use thereof with the reciprocating sickle or knife blade during the use of the device, the drive shaft being operatively connected with the sickle bar or knife blade through the medium of a fly wheel, which has in turn connected therewith the pitman rod carried by the reciprocatory sickle bar or knife blade.

A still further object of my invention is to provide an improved hand mower of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:—

Figure 1 is a side elevation of my improved hand mower showing the sickle bar and guard therefor in section.

Figure 2 is a top plan view of my improved device showing parts of the breast plate in section.

Figure 3 is a front elevation of the breast plate illustrating the method of connecting the same to the body of the user.

Figure 4 is a rear elevation showing my improved breast plate applied to the body of the user of the device.

Figure 5 is a longitudinal section through the mower bar guard.

Figure 6 is a substantially horizontal section taken on the line 6—6 of Figure 5 looking in the direction of the arrows.

Figure 7 is a fragmentary detail front elevation illustrating the means for connecting the device to the breast plate and showing the means for driving the drive shaft from a small electric motor.

Figure 8 is a fragmentary front elevation showing the driving electric motor carried directly by the frame bar of the mower guard.

Figure 9 is an enlarged fragmentary detail front elevation with parts thereof broken away and in section, illustrating the means employed for adjusting the angle of the sickle bar and guard.

Figure 10 is a detail fragmentary longitudinal section through the drive shaft showing the telescoping joint incorporated in the length thereof.

Figure 11 is a detail section through the telescoping joint of the drive shaft taken on the line 11—11 of Figure 10, and Figure 12 is a detail section taken on the line 12—12 of Figure 9 looking in the direction of the arrows illustrating the adjusting means employed for governing the angle of the reciprocatory sickle blade or bar and guard therefor.

Referring to the drawings in detail, wherein similar reference characters designate corresponding parts throughout the several views, the letter A generally indicates my improved device, which comprises the supporting device B for connection with the body of the wearer and the mower device per se C.

The improved supporting device B comprises a breast plate 15 which can be formed of sheet metal and which includes a vertically disposed centrally positioned body plate 16 having its upper end bifurcated and curved to provide shoulder engaging hooks 17. The lower end of the body plate 16 has formed thereon arcuately extending waist engaging guard plates 18. Suitable shoulder straps 19 can be connected to the shoulder hooks 17 and to a breast strap 20 which encircles the chest of the wearer. The ends of the waist plates 18 are connected together by a suitable waist belt 21. The central body plate 16 at the point of connection thereof with the waist plate 18 supports a forwardly extending and downwardly angled bracket or casing member 22 to which the mower C is detachably connected, as will be later set forth. It is to be noted that this casing or bracket 22 includes side walls 23 and a bottom wall 24, the upper edge of which is notched as at 25. The body plate 16 adjacent to its upper end can be provided with a staple 26, for a purpose, which will be later described.

The improved device C comprises a mower guard 30 which reciprocately supports the sickle or knife bar 31, which bar is provided with a plurality of equi-distantly spaced forwardly projecting V-shaped teeth 32 for cooperation with the stationary V-shaped guard teeth 33. One end of the mower guard 30 has formed thereon or secured thereto the laterally extending frame plate 34, which is provided with a vertical bearing for rotatably supporting the stub shaft 35, to which is keyed or otherwise secured the fly wheel 36. This fly wheel 36 has eccentrically secured thereto the clamp or wrist pin 37 to which is operatively connected the pitman rod 38. The pitman rod 38 extends inwardly toward the reciprocatory sickle or knife bar 31 and is operatively connected thereto through the medium of a suitable pivot pin 39. The frame plate 30 adjacent to its opposite ends carries suitable bearing brackets 40 and 41 which brackets rotatably support the longitudinally extending operating shaft 42. This shaft is operatively connected to the stub shaft 35 through the medium of suitable bevel gears 43 and 44. The bracket 41 also provides a bearing for the lower end of the drive shaft 45 which extends upwardly and rearwardly toward the operator, as will be later described. The lower end of the drive shaft 45 is operatively connected to the operating shaft 42 through the medium of suitable bevel gears 46 and 47.

The mower guard 30 has riveted or otherwise secured thereto an upstanding angle shaped bracket 48 to which is connected by means of a pivot pin 49 a bell crank shaped bracket 50. The lower arm of the bell crank shaped bracket 50 has secured thereto the elongated supporting rod or bar 52 which extends upwardly and rearwardly toward the operator. This supporting rod 52 has a turn buckle 53 incorporated in the length thereof so that the active length of this bar can be changed to suit the varying conditions, such as the height of the operator. The upper end of supporting rod 52 is rotatably mounted in a bearing 54 carried by the attaching bracket or casting 55 which is bolted or otherwise removably secured, as at 56 to the side walls 43 of the supporting bracket or casing 22 carried by the breast plate 15. The supporting rod 52 extends rearwardly of the attaching casting or bracket 55 and is received within the notch 25 of the lower wall 24 of the supporting bracket or casing 22. The bracket 55 is also provided with a bearing 57 for the upper end of the drive shaft 45, as shown, and the upper end of this shaft has keyed or otherwise secured thereto a gear 58 which is adapted to mesh with a crown or similar gear 59, keyed or otherwise secured to an operating shaft 60 rotatably mounted within a suitable bearing 61 of the attaching bracket 55. The crown gear 59 can have secured thereto an operating crank 62 whereby the same can be conveniently rotated for driving the shaft 45 and consequently reciprocating the sickle bar or knife blade 31.

In order to insure the correct operation of the device at all times and under all conditions, I preferably incorporate in the length of the drive shaft 45 a pivot joint 63 and directly below the pivot joint 63 a telescoping joint 64, whereby the active length of this drive shaft can be changed. Also adjacent to the lower end of this shaft a suitable universal joint 65 is employed. In the present instance I have shown the universal joint 65 embodying an intermediate fiber or similar flexible disc 66 to the opposite faces of which at quarters is connected spiders 67 and 68 which are in turn connected to the adjacent ends of the shaft 45 which is cut at this point to receive said universal joint.

In order to further effectively support the device and to relieve the body of the user from undue strain and jar, I provide a flexible supporting member 69 which includes a supporting rod 70 pivotally connected at its lower end to the upper arm of the bell crank shaped bracket 50. This rod 70 has incorporated in the length thereof a suitable turn buckle structure 71 whereby the active length thereof can be adjusted. The upper end of the rod 70 has connected therewith a relatively heavy contractile coil spring 72, the upper end of which is connected by means of a hook 73 with the staple 26 carried by the body plate 16 of the breast plate 15.

By this construction so far, it can be seen that the mower device per se C can be readily connected with the breast plate 15 and that by operating the crank 62 that the mower sickle or knife bar 31 can be readily reciprocated for effectively cutting the grass, weeds, or the like on ditch slopes, adjacent to fences where ordinary power mowers cannot be operated with success. Due to the suspension of the mower bar it is obvious that the bar can be readily moved over the ground for effectively accomplishing the desired cutting of the weeds, grass or the like.

Under certain conditions, such as on ditch slopes or the like, it may be advisable to change the angle of the knife blade 31 and its guard 30 and consequently means 80 is provided for turning the supporting rod 52 so that the entire mower bar can be turned on the attaching bracket 55 and the supporting bracket or casing 22. This means 80 embodies a worm wheel 81 keyed or otherwise secured to the rod 52 adjacent to its upper end which worm wheel has meshing therewith a worm 82 rotatably mounted in the side plates 23 of the supporting bracket or casing 22. A hand wheel 83 is secured to one end of the worm 82 and it is obvious that upon turning of this hand wheel 83 that motion will be imparted to the worm wheel 81 and consequently to the rod 52 thus bringing about the turning of the entire mower bar and its operating mechanism.

In order to hold the worm 82 against accidental turning movement, the same can be provided with a ratchet wheel 84 adapted to be engaged by a pivoted dog 85 carried by the supporting bracket or casing 22.

While I have illustrated a hand crank 62 for operating the drive shaft 45, it is obvious, that where conditions are applicable that the operating shaft 45 can be rotated by a suitable small electric motor and in Figure 7 I have illustrated such an arrangement. As shown in Figure 7, an electric motor 90 can be bolted or otherwise secured directly to the attaching bracket or casting 55 and its armature shaft 91 can have keyed thereto a bevel gear 92 for meshing with a bevel gear 93 which can be keyed or otherwise secured to the upper end of said shaft 45.

If preferred, the drive shaft 45 can be eliminated when an electric motor is used and the motor connected directly with the frame plate 34.

In Figure 8 I have shown an arrangement by which this can be accomplished and I can employ an angle bracket 100 which can be bolted or otherwise secured to a flange formed on said frame bar and this bracket can have bolted or otherwise secured thereto the casing of an electric motor 101. The armature shaft 102 of this motor can have keyed or otherwise secured thereto a bevel gear 103 which can mesh with a bevel gear 104 connected directly to the stub shaft 35 to which is keyed or otherwise secured the fly wheel 36 of the piston.

When the mower is used in localities where electric current is not available, a small internal combustion engine can be substituted for the electric motor.

Changes in details may be made without departing from the spirit or the scope of this invention, but:—

What I claim as new is:

1. A mower comprising a body supporting device including a breast plate, means for attaching the breast plate to the wearer, a supporting bracket on the breast plate, a supporting rod rotatable in said bracket, a second bracket connected with the lower end of the supporting bar, a mower guard bar connected with the second bracket, a reciprocatory sickle bar carried by the mower bar, means for reciprocating the sickle bar from the frame bar, a worm rotatably carried by the supporting bracket, means for rotating the worm, means for locking the worm in an adjusted position, and a worm wheel keyed on the supporting rod meshing with said worm for rotating the rod, second bracket and guard bar upon the turning of the worm.

2. A mower comprising a body supporting device including a breast plate, means for attaching the breast plate to the body of the wearer, a supporting bracket carried by the lower end of the breast plate, a mower guard bar, a frame plate projecting laterally from one end of the guard bar, a reciprocatory sickle bar, a pivot bracket secured at the meeting point of the frame plate and mower guard bar, a bell crank shaped bracket pivotally secured to the first mentioned bracket, a supporting rod secured to one arm of the bell crank shaped bracket and connected with the supporting bracket of the breast plate, a supporting rod connected with the other arm of the bell crank shaped bracket, a contractile coil spring connected with said second mentioned rod, and means for detachably connecting the upper end of the spring to the breast plate adjacent to the upper end thereof, and means for operating the reciprocatory sickle bar from the frame bar.

3. A mower comprising a body supporting device including a breast plate, means for attaching the breast plate to the body of the wearer, a supporting bracket carried by the lower end of the breast plate, a mower guard bar, a frame plate projecting laterally from one end of the guard bar, a reciprocatory sickle bar, a pivot bracket secured at the meeting point of the frame bar and mower guard plate, a bell crank shaped bracket pivotally secured to the first mentioned bracket, a supporting rod secured to one arm of the bell crank shaped bracket and connected with the supporting bracket of the breast plate, a supporting rod connected with the other arm of the bell crank shaped bracket, a contractile coil spring connected with said second mentioned rod, means for detachably connecting the upper end of the spring to the breast plate adjacent to the upper end thereof, means for operating the reciprocatory sickle bar from the supporting bracket, and means for adjusting the length of the first and second mentioned supporting rods.

4. A mower comprising a body supporting device including a breast plate, means for attaching the breast plate to the body of the wearer, a supporting bracket carried by the lower end of the breast plate, a mower guard bar, a frame plate projecting laterally from one end of the guard bar, a reciprocatory sickle bar, a pivot bracket secured at the meeting point of the frame bar and mower guard plate, a bell crank shaped bracket pivotally secured to the first mentioned bracket, a supporting rod secured to one arm of the bell crank shaped bracket and connected with the supporting bracket of the breast plate, a supporting rod connected with the other arm of the bell crank shaped bracket, a contractile coil spring connected with said second mentioned rod, means for detachably connecting the upper end of the spring to the breast plate adjacent to the upper end thereof, means for operating the reciprocatory sickle bar from the frame bar, means for adjusting the length of the first and second mentioned supporting rods, said operating means for the sickle bar including a drive shaft extending longitudinally of the first supporting bar, a telescoping joint in said drive shaft, a universal joint incorporated in said drive shaft, a drive wheel, means for operating the drive wheel from said drive shaft, means operatively connecting the drive wheel to the sickle bar, and a rotatable hand wheel arranged adjacent to the supporting bracket of the breast plate operatively connected to the drive shaft.

In testimony whereof I affix my signature.

CARL R. BENZEL.